(12) United States Patent
Ciamarra

(10) Patent No.: US 11,401,830 B2
(45) Date of Patent: Aug. 2, 2022

(54) GEOMETRY FOR A TURBINE ENGINE BLADE OUTER AIR SEAL

(71) Applicant: UNITED TECHNOLOGIES CORPORATION, Farmington, CT (US)

(72) Inventor: Christina G Ciamarra, Kittery, ME (US)

(73) Assignee: Raytheon Technologies Corporation, Farmington, CT (US)

(*) Notice: Subject to any disclaimer, the term of this patent is extended or adjusted under 35 U.S.C. 154(b) by 187 days.

(21) Appl. No.: 16/562,527

(22) Filed: Sep. 6, 2019

(65) Prior Publication Data

US 2021/0071544 A1 Mar. 11, 2021

(51) Int. Cl.
*F01D 21/04* (2006.01)
*F01D 11/12* (2006.01)

(52) U.S. Cl.
CPC .......... *F01D 21/045* (2013.01); *F01D 11/12* (2013.01); *F05D 2240/55* (2013.01)

(58) Field of Classification Search
CPC . F01D 9/04; F01D 11/08; F01D 11/12; F01D 21/045; F01D 25/246; F05D 2240/11; F05D 2240/55; F05D 2240/81; F05D 2260/20
See application file for complete search history.

(56) References Cited

U.S. PATENT DOCUMENTS

| 7,600,967 | B2* | 10/2009 | Pezzetti, Jr. | .......... F01D 11/005 415/115 |
| 8,251,637 | B2* | 8/2012 | Lewis | ..................... F01D 11/12 415/1 |
| 10,077,680 | B2 | 9/2018 | Thibodeau et al. | |
| 2007/0009349 | A1* | 1/2007 | Ward | ..................... F01D 25/12 415/115 |
| 2009/0169368 | A1* | 7/2009 | Schlichting | ........... F01D 11/122 415/173.1 |

(Continued)

FOREIGN PATENT DOCUMENTS

| EP | 3019707 | 5/2016 |
| EP | 3118419 | 1/2017 |

(Continued)

OTHER PUBLICATIONS

European Search Report for Application No. 20192940.3 dated Nov. 10, 2020.

*Primary Examiner* — Woody A Lee, Jr.
*Assistant Examiner* — Eric A Lange
(74) *Attorney, Agent, or Firm* — Carlson, Gaskey & Olds, P.C.

(57) ABSTRACT

A blade outer air seal for a gas turbine engine includes a platform having a leading edge and a trailing edge, and at least one cooling cavity disposed within the platform. A pair of circumferential edges connects the leading edge and the trailing edge. An end wall protrudes radially outward from the platform at the trailing edge. A support hook protrudes radially outward from a leading edge of the platform. A boss structure protrudes radially outward from the platform and defining a solid kinetic energy path from an inner diameter of the platform to a radially outward facing surface of the boss structure, wherein the boss structure extends less than a circumferential length of the platform.

19 Claims, 2 Drawing Sheets

(56) References Cited

U.S. PATENT DOCUMENTS

| | | | |
|---|---|---|---|
| 2012/0189426 A1* | 7/2012 | Thibodeau | F01D 11/08 |
| | | | 415/1 |
| 2013/0115065 A1 | 5/2013 | Correia et al. | |
| 2014/0127006 A1* | 5/2014 | Romanov | F01D 9/04 |
| | | | 415/173.1 |
| 2016/0123186 A1 | 5/2016 | Stover et al. | |
| 2016/0369644 A1* | 12/2016 | Blaney | F01D 5/02 |

FOREIGN PATENT DOCUMENTS

| | | |
|---|---|---|
| EP | 3246523 | 11/2017 |
| EP | 3543468 | 9/2019 |

* cited by examiner

GEOMETRY FOR A TURBINE ENGINE BLADE OUTER AIR SEAL

TECHNICAL FIELD

The present disclosure relates generally to blade outer air seal constructions for a gas turbine engine, and more specifically to a blade outer air seal construction including boss feature.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

The primary flowpath connecting the compressor, the combustor, and the turbine section is defined by multiple flowpath components including vanes, rotors, blade outer air seals and the like. In order to ensure ideal airflow through the primary flowpath, blade outer air seals are disposed radially outward of the rotors. The blade outer air seals are arranged in a circumferential manner.

SUMMARY OF THE INVENTION

In one example, a blade outer air seal for a gas turbine engine includes a platform having a leading edge and a trailing edge, and at least one cooling cavity disposed within the platform, a pair of circumferential edges connecting the leading edge and the trailing edge, an end wall protruding radially outward from the platform at the trailing edge, a support hook protruding radially outward from a leading edge of the platform, a boss structure protruding radially outward from the platform and defining a solid kinetic energy path from an inner diameter of the platform to a radially outward facing surface of the boss structure, wherein the boss structure extends less than a circumferential length of the platform.

In another example of the above described blade outer air seal, the platform includes exactly one boss structure.

In another example of any of the above described blade outer air seals, the boss structure is circumferentially centered on the platform.

In another example of any of the above described blade outer air seals, a first feather seal intrudes circumferentially into a first circumferential edge of the pair of circumferential edges and a second end seal intruding into a second circumferential edge of the pair of circumferential edges.

In another example of any of the above described blade outer air seals, each circumferential edge in the pair of circumferential edges protrudes radially outward form the platform, and wherein the boss structured protrudes radially outwards at least as far as the pair of circumferential edges.

In another example of any of the above described blade outer air seals, the boss structure protrudes radially exactly as far as the pair of circumferential edges.

In one example, a gas turbine engine includes a compressor section having a plurality of compressor stages, a combustor section fluidly connected to the compressor section, a turbine section fluidly connected to the combustor section and having a plurality of turbine stages, at least one of the turbine sections and the compressor sections including a set of circumferentially arranged rotors and a set of blade outer air seals disposed radially outward of the circumferentially arrange rotors, each of the blade outer air seals being connected to an engine case structure via a case support each blade outer air seal in the set of blade outer air seals including, a platform having a leading edge and a trailing edge, and at least one cooling cavity disposed within the platform, a pair of circumferential edges connecting the leading edge and the trailing edge, an end wall protruding radially outward from the platform at the trailing edge, a support hook protruding radially outward from a leading edge of the platform, a boss structure protruding radially outward from the platform and defining a solid kinetic energy path from an inner diameter of the platform to a radially outward facing surface of the boss structure, wherein the boss structure extends less than a circumferential length of the platform, and an engine case support connecting each blade outer air seal to an engine case, the case support including a connector received in the support hook of each blade outer air seal, the case support further including at least one radially inwardly protruding tab aligned with the boss structure of each blade outer air seal.

In another example of the above gas turbine engine, each boss structure has a circumferential length at least as long as a circumferential length of the corresponding radially inwardly protruding tab.

In another example of any of the above gas turbine engines, the circumferential length of each boss structure is longer than a circumferential length of the corresponding radially inwardly protruding tab.

In another example of any of the above gas turbine engines, each radially inwardly protruding tab and each corresponding boss structure define a sold kinetic energy path during a blade off event.

In another example of any of the above gas turbine engines, each boss structure has a radial height at most as high as the pair of circumferential edges on the corresponding blade outer air seal.

In another example of any of the above gas turbine engines, each boss structure extends a same radial height as the pair of circumferential edges on the corresponding blade outer air seal.

In another example of any of the above gas turbine engines, each of said circumferential edges includes a circumferentially intruding feather seal slot configured to receive a feather seal, and wherein each of the feather seal slots is defined by a lack of radial breakthrough.

In another example of any of the above gas turbine engines, a gap between each boss structure and the corresponding at least one radially inwardly protruding tab aligned is less than 1.905 mm.

In another example of any of the above gas turbine engines, the engine case support comprises a second set of radially inward protruding tabs, and wherein each radially inward protruding tab in the second set is circumferentially aligned with at least one circumferential edge.

These and other features of the present invention can be best understood from the following specification and drawings, the following of which is a brief description.

DETAILED DESCRIPTION

Figure 1:
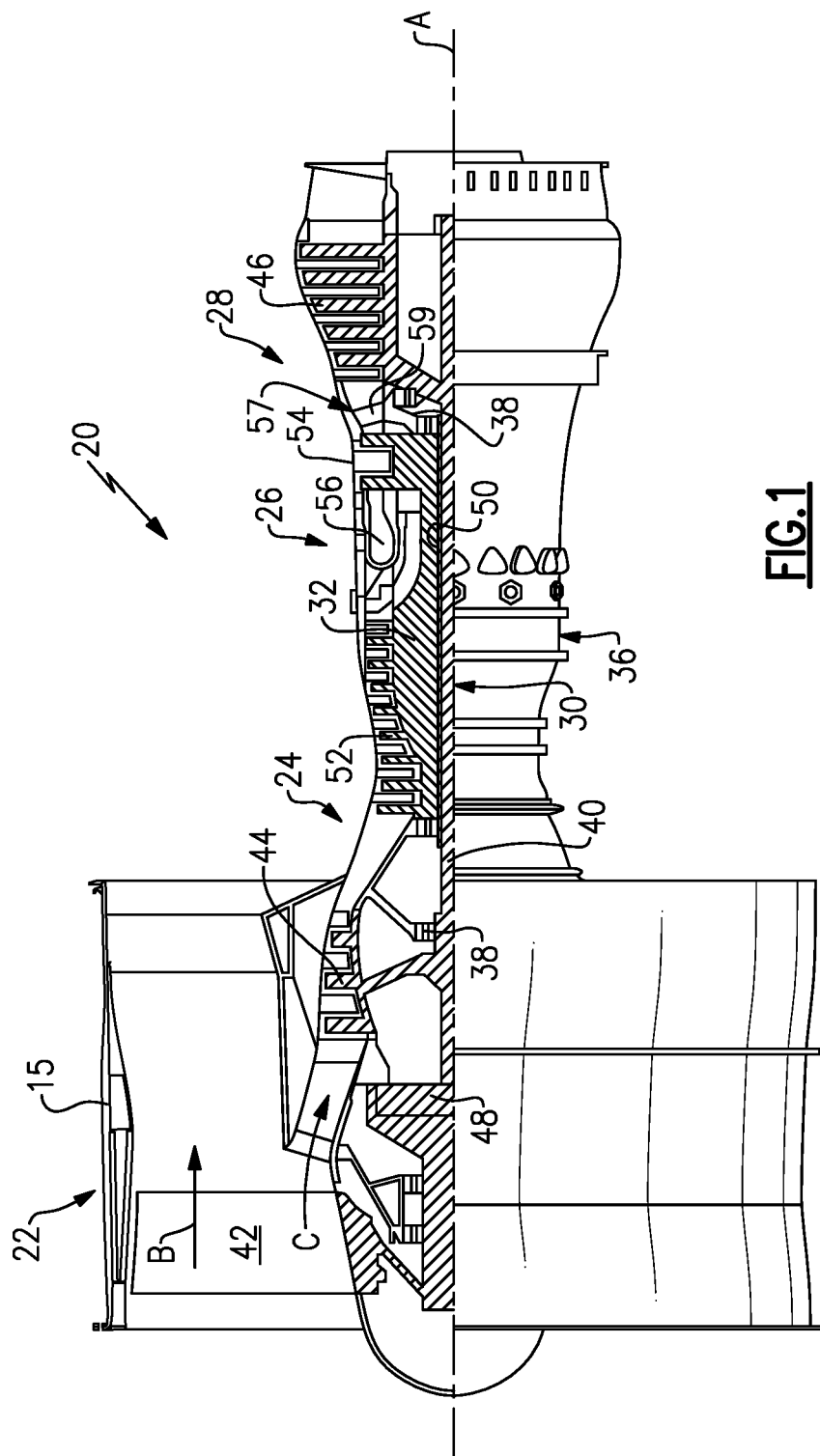
FIG. 1 illustrates a high level schematic view of an exemplary imaging system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Included within the compressor and turbine sections are multiple stages, each of which includes rotors and vanes. At an axial position of each of the rotors, the radially outward portion of the primary flowpath C is comprised of a circumferential ring of blade outer air seals. Each of the blade outer air seals includes a circumferential feather seal slot configured to receive a feather seal and seal a gap that can exist between the blade outer air seal and a circumferentially adjacent blade outer air seal. During operation of the aircraft engine, one potential hazard that can occur is a rotor blade escaping the rotor disc due to damage, vibrations, or other defects. Such an event is referred to as a blade off event, and can cause the blade to be projected radially outward from the engine shaft.

Previous blade outer air seal designs included a circumferential rib in close radial proximity to tabs extending radially inward from the support. The gap between the ribs and the tabs was small enough to quickly close in the case of a blade off event, thereby providing an almost immediate pathway for kinetic energy from the blade off event to be provided to the engine case.

Figure 2:
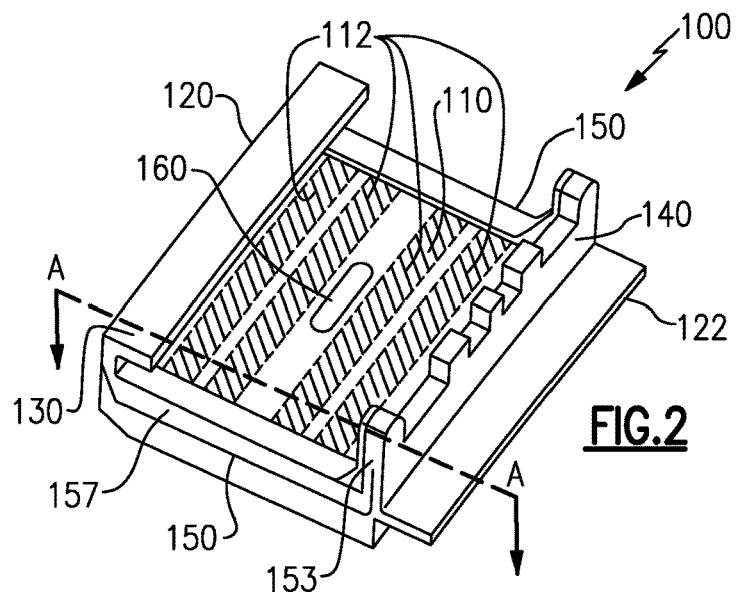
FIG. 2 schematically illustrates an isometric view of a blade outer air seal assembly.

With continued reference to FIG. 1, FIG. 2 schematically illustrates an exemplary blade outer air seal 100 for use in the engine 20 of FIG. 1. The blade outer air seal 100 includes a platform 110 having a leading edge 120 and a trailing edge 122. The leading edge 120 is the upstream most edge of the platform 110, relative to an expected flow of fluid through a gas turbine engine including the blade outer air seal, during expected engine operations. Near the trailing edge 122 is a radially protruding support wall 140. Similarly, at the leading edge 120 is a support hook 130 that protrudes radially outward from the platform 110. The support wall 140 and the support hook 130 combine to interface with a static engine support structure and maintain the blade outer air seal 100 in the desired axial and radial position through assembly and operation of the gas turbine engine. As used herein relative terms such as "radial", "axial", "circumferential" and the like are relative to a centerline of an engine incorporating the components.

Extending along the circumferential edges of the platform 110 and connecting the leading edge 120 to the trailing edge 122 are circumferential edge walls 150. Structural support ribs 153 connect a downstream end of each circumferential edge wall 150 with a corresponding portion of the support wall 140. Protruding circumferentially into each of the circumferential edge walls 150 is a feather seal slot 152.

The circumferential edge wall 150 protrudes radially outward from the platform along the entire distance from the support hook 130 at the leading edge 120 to the support wall 140 near the trailing edge 122. By protruding radially outward from the platform 110 along the entire distance, the geometry of the blade outer air seal 100 ensures that the feather seal slot 152 does not break out from (extend through) a radially outward facing surface of the circumferential edge wall 150, thereby improving performance of the feather seal. Extending the circumferential edge walls 150 to prevent radial breakout of the featherseal slot further necessitated a reduction in a radial height of support tabs, as described below.

In order to cool the platform 110 during engine operations multiple cooling cavities 112 are included within the platform 110. The cooling cavities 112 allow for the inflow and outflow of a coolant, such as air. The cooling cavities 112 introduce a void into the platform 110 and there is not a solid mechanical pathway through the platform 110 at the location of the cooling cavities 112. A rib crossing the cooling cavities 112 would not provide the safety function of the previously utilized ribs due to the void.

To replicate this functionality, without reliance on a pre-existing circumferential rib which provides a solid kinetic energy path, the blade outer air seal 100 includes a boss feature 160 that protrudes radially outward from the platform 110, and extends less than the circumferential length of the platform 110. In order to ensure full damage prevention functionality, the boss feature 160, as well as the portions of the platform radially inward of the damage center boss 160 are solid material and do not include any voids. In the illustrated example, the boss feature 160 is circumferentially centered on the platform. In alternative examples, the boss feature 160 is circumferentially off-center.

Figure 3:
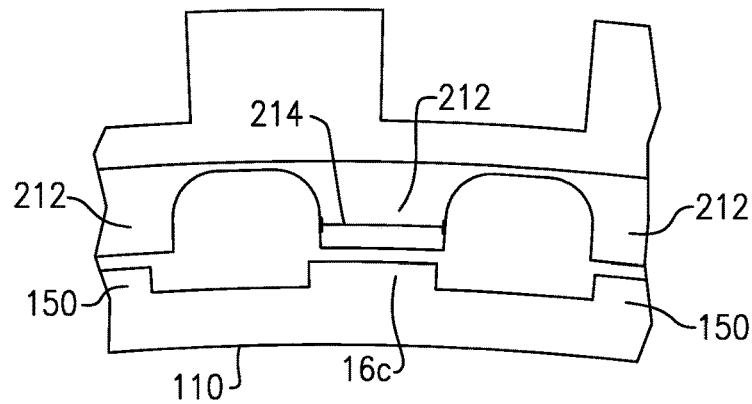
FIG. 3 schematically illustrates a cross sectional view of the blade outer air seal assembly of FIG. 2.

With continued reference to FIG. 2, FIG. 3 schematically illustrates a cross section of the blade outer air seal 100 FIG. 2 drawn along section line A-A and connected to an engine case via a static support 210. The static support 210 includes a radially inward protruding tab 212. The radially inward protruding tab 212 extends only a partial circumferential length of the blade outer air seal 100, and corresponds to the boss feature 160 of the blade outer air seal 100. In order to provide a a sufficient circumferential span of material to block a blade during a blade off event, in the absence of the previously used rib, the boss feature 160 is circumferentially aligned with the radially inward protruding tab 212.

In the example of FIGS. 2 and 3, the platform 110 is limited to a single boss feature 160. In alternative examples, additional boss featurees 160 can be included protruding radially outward from the platform 110. In some examples, the additional boss featurees are circumferentially aligned with each other such that each of the boss featurees is positioned at the same axial position.

When placed in an installed position, each boss feature 160 includes a radially outward facing surface that is aligned with the corresponding radially inward protruding tab 212, with the boss feature 160 and the corresponding tab 212 being in the same circumferential position. In the example of FIGS. 2 and 3, the boss feature 160 extends a radial height 162 that is limited to the height of the circumferential edge wall 150. Defined between the boss feature 160 and the radially inward protruding tab 212 is a gap 215. In order to ensure almost immediate mechanical closure for the kinetic pathway in the case of a blade off event, the gap 215 is at most 1.905 mm.

Figure 4:
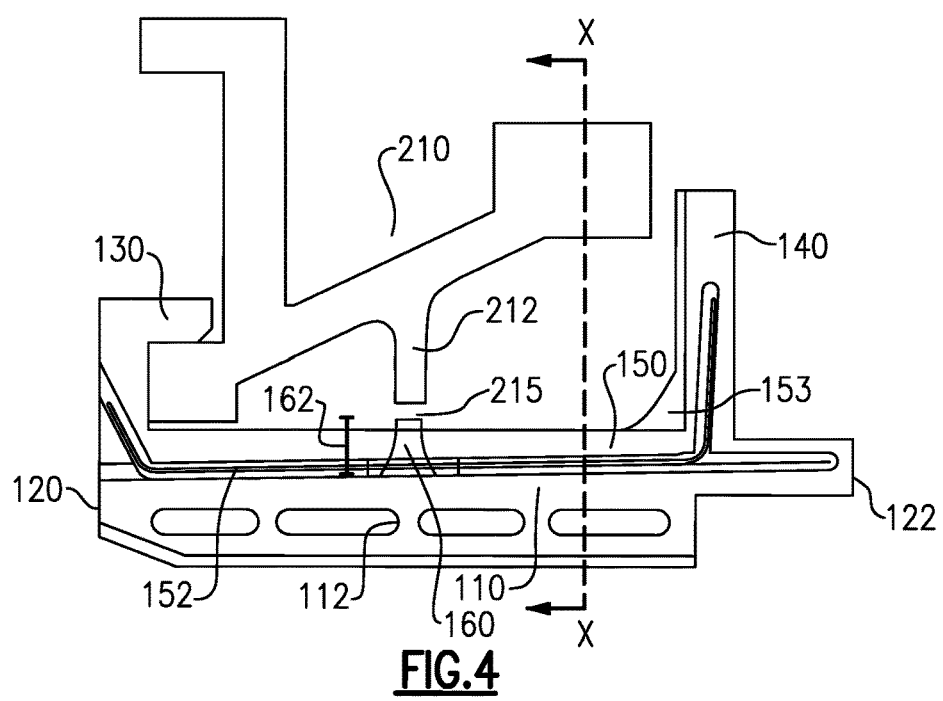
FIG. 4 schematically illustrates a cross sectional view of the blade outer air seal assembly of FIG. 3.

With continued reference to FIGS. 2 and 3, FIG. 4 schematically illustrates a cross section of FIG. 3 drawn along line X-X. In addition to the boss feature 160 providing a mechanical pathway for kinetic energy, each of the circumferential edge walls 150 corresponds to a radially inward protruding 212, with the radially inward protruding tabs 212 corresponding to the circumferential edge walls 150 being radially outward of two adjacent circumferential edge walls 150.

In the example of FIG. 4, a circumferential length 214 of each of the radially inward protruding tabs 212 is slightly less than the circumferential length of the corresponding boss portion 160. The slight variance in circumferential length allows the support tabs 212 to compensate for manufacturing variances, while still ensuring that the entirety of the support tab overlaps the corresponding boss 16 and a sufficient mechanical connection to pass kinetic energy is formed.

The structure disclosed herein allows for the blade outer air seal 100 to have uninterrupted material (i.e. be solid) from the inner diameter surface of the blade outer air seal to the point of contact on the support during a blade out event. This allows for energy that is initiated at the gas path to travel through this material and transfer to the support directly. The Support in turn provides a direct mechanical connection to the engine case which aids in blade containment functionality.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A blade outer air seal for a gasturbine engine comprising:
   a platform having a leading edge, a trailing edge, a radially outward facing surface, a radially inward facing surface and at least one cooling cavity disposed within the platform between the radially outward facing surface and the radially inward facing surface, wherein the at least one cooling cavity includes at least one cooling cavity extending a full circumferential length of the platform in a circumferential direction;

a pair of circumferential edges connecting the leading edge and the trailing edge;
an end wall protruding radially outward from the platform at the trailing edge;
a support hook protruding radially outward from the leading edge of the platform;
a boss structure protruding radially outward from the radially outward facing surface of the platform and defining a solid kinetic energy path from the radially inward facing surface of the platform to a radially outward facing contact surface of the boss structure, wherein the boss structure extends in a circumferential direction less than a circumferential length of the platform; and
a second a boss structure protruding radially outward from the radially outward facing surface of the platform and defining a second solid kinetic energy path from the radially inward facing surface of the platform to a radially outward facing contact surface of the second boss structure, and wherein the boss structure and the second boss structure are circumferentially aligned with each other such that each of the boss structures is positioned at a same axial position.

2. The blade outer air seal of claim 1, wherein the platform includes exactly one boss structure.

3. The blade outer air seal of claim 2, wherein the boss structure is circumferentially centered on the platform.

4. The blade outer air seal of claim 1, further comprising a first feather seal intruding circumferentially into a first circumferential edge of the pair of circumferential edges and a second end seal intruding into a second circumferential edge of the pair of circumferential edges.

5. The blade outer air seal of claim 1, wherein each circumferential edge in the pair of circumferential edges protrudes radially outward from the platform, and wherein the boss structured protrudes radially outwards at least as far as the pair of circumferential edges.

6. The blade outer air seal of claim 5, wherein the boss structure protrudes radially exactly as far as the pair of circumferential edges.

7. The blade outer air seal of claim 1, wherein the at least one cooling cavity extends from a first of the pair of circumferential edges to a second of the pair of circumferential edges.

8. The blade outer air seal of claim 1, wherein the at least one cooling cavity includes an opening at one of the circumferential edges in the pair of circumferential edges.

9. A gas turbine engine comprising:
a compressor section having a plurality of compressor stages;
a combustor section fluidly connected to the compressor section;
a turbine section fluidly connected to the combustor section and having a plurality of turbine stages;
at least one of the turbine sections and the compressor sections including a set of circumferentially arranged rotors and a set of blade outer air seals disposed radially outward of the circumferentially arrange rotors, each of the blade outer air seals being connected to an engine case structure via an engine case support;
each blade outer air seal in the set of blade outer air seals including
a platform having a leading edge and a trailing edge, and at least one cooling cavity disposed within the platform, wherein the at least one cooling cavity includes at least one cooling cavity extending a full circumferential length of the platform in a circumferential direction;
a pair of circumferential edges connecting the leading edge and the trailing edge;
an end wall protruding radially outward from the platform at the trailing edge;
a support hook protruding radially outward from the leading edge of the platform;
a boss structure protruding radially outward from the platform and defining a solid kinetic energy path from an inner diameter of the platform to a radially outward facing surface of the boss structure, wherein the boss structure extends in a circumferential direction less than a circumferential length of the platform;
the engine case support including a connector received in the support hook of each blade outer air seal, the engine case support further including at least one radially inwardly protruding tab aligned with the boss structure of each blade outer air seal; and
a gap exists between each boss structure and the corresponding at least one radially inwardly protruding tab aligned with the boss structure, and wherein the gap is configured to provide almost immediate mechanical closure for a kinetic pathway in a blade off event.

10. The gas turbine engine of claim 9, wherein each boss structure has a circumferential length at least as long as a circumferential length of the corresponding radially inwardly protruding tab.

11. The gas turbine engine of claim 10, wherein the circumferential length of each boss structure is longer than a circumferential length of the corresponding radially inwardly protruding tab.

12. The gas turbine engine of claim 9, wherein each radially inwardly protruding tab and each corresponding boss structure define a solid kinetic energy path during a blade off event.

13. The gas turbine engine of claim 9, wherein each boss structure has a radial height at most as high as the pair of circumferential edges on the corresponding blade outer air seal.

14. The gas turbine engine of claim 13, wherein each boss structure extends a same radial height as the pair of circumferential edges on the corresponding blade outer air seal.

15. The gas turbine engine of claim 9, wherein each of said circumferential edges includes a circumferentially intruding feather seal slot configured to receive a feather seal, and wherein each of the feather seal slots is defined by a lack of radial breakthrough.

16. The gas turbine engine of claim 9, wherein the gap between each boss structure and the corresponding at least one radially inwardly protruding tab aligned is less than 1.905 mm.

17. The gas turbine engine of claim 9, wherein the engine case support comprises a second set of radially inward protruding tabs, and wherein each radially inward protruding tab in the second set is circumferentially aligned with at least one circumferential edge.

18. The gas turbine engine of claim 9, wherein a radially inward facing surface of the at least one radially inward protruding tab is aligned with the radially outward facing surface of the boss.

19. The gas turbine engine of claim 9, wherein the gap is defined between a radially inward facing surface of the at least one radially inward protruding tab and the radially outward facing surface of the boss.

\* \* \* \* \*